United States Patent [19]

Nougaret et al.

[11] 3,891,931

[45] June 24, 1975

[54] CONTROL SYSTEM FOR SWITCHING ELEMENT

[75] Inventors: Marcel Nougaret, Seyssinet; Jean-Claude Belmonte, Echirolles, both of France

[73] Assignee: Societe Generale de Constructions Electriques et Mecaniques (ALSTHOM), France

[22] Filed: Sept. 29, 1972

[21] Appl. No.: 293,509

[30] Foreign Application Priority Data

Sept. 29, 1971 France ............................ 71.35146

[52] U.S. Cl. ................ 328/127; 307/229; 307/233; 307/252 N; 307/284; 323/22 SC

[51] Int. Cl. ................................................ G06g 7/18

[58] Field of Search ........... 307/266, 284, 233, 229, 307/252 N; 328/129, 127; 323/22 SC

[56] References Cited

UNITED STATES PATENTS

| | | | |
|---|---|---|---|
| 3,358,218 | 12/1967 | Halpin | 323/22 |
| 3,386,037 | 5/1968 | Yamada | 328/134 |
| 3,388,313 | 6/1968 | Fisher | 321/60 |
| 3,395,335 | 7/1968 | Stein | 323/22 |
| 3,431,501 | 3/1969 | David et al. | 328/161 |
| 3,444,361 | 5/1969 | Bekey | 235/183 |
| 3,452,218 | 6/1969 | Kedson et al. | 307/229 |
| 3,641,444 | 2/1972 | Watts | 328/127 |
| 3,702,394 | 11/1972 | Rainsberger et al. | 235/183 |
| 3,717,818 | 2/1973 | Herbst | 328/141 |

*Primary Examiner*—Andrew J. James
*Assistant Examiner*—Joseph E. Clawson, Jr.
*Attorney, Agent, or Firm*—Craig & Antonelli

[57] ABSTRACT

The invention concerns the controlling by impulses of a switching element operating by "hit or miss" means. It is characterized in that an integrator supplies the instantaneous value of the integral of a function of the current supply voltage, and in that a comparator receiving that instantaneous value and the control signal emits, according to the comparison of those two magnitudes, a switching order from the switching element. The invention applies more particularly to thyristors and to transistors and makes it possible to ensure linearizing of the control.

7 Claims, 20 Drawing Figures

CONTROL SYSTEM FOR SWITCHING ELEMENT

The invention concerns a control device for switching elements operating by the "hit or miss" process, such as thyristors energized by a mains or a periodic voltage, or transistors operating according to the "saturated-blocked" principle.

It is already known how to control these elements by means of pulses, this being more economical, less cumbersome and more reliable than continuous controlling, but this results in a serious disadvantage by the very nature of the type of control which modulates the width of the voltage wave of the current supply. The response to the control signal is not linear, and this disadvantage is a particular hindrance in servo systems and prognostication orders.

It has been found, according to the present invention, that it was possible to ensure, in the control by impulses, by simple means, a linear relation between the average value of a function of the useful signal collected at the output of the switching element, such as the amplitude of the voltage or the power of that signal, for example, and the control signal, whatever the fluctuations of the current supply may be. For that purpose, the invention provides a device for control by impulses, dependent on a control signal from a switching element operating by the "hit or miss" process and connected to a current supply having a periodic voltage, comprising an integrator which supplies the instantaneous value of the integral of a function of the periodic supply voltage and a comparator which receives, at its input, that instantaneous value and, directly or indirectly, the said control signal, and sends out, according to the comparison of those two magnitudes, a switching order (opening or closing) for the switching element, and characterized in that the said integrated value is brought back, at each pass through zero of the periodic supply voltage, to an original value, other than zero, provided for compensating variations in the periodic voltage supply.

The instant at which the switching is to take place for a function of the useful signal, leaving the switching element, which has been determined, to have a medium value dependent linearly on the control signal, is calculated in each period of the supply voltage. Indeed, the integrator shows the average value of the said function either during the conductive time of the switching element, in the case of an element controlled on closing, such as a transistor, or during the blocked time of the switching element, (case of an element controlled on opening, such as a thyristor).

The control signal may arrive directly on an input of the comparator, or reach it indirectly by taking a part in determining the original value of the integrator.

Therefore an integral of a function of the supply voltage, considered during the used or unused portion of a halfperiod, is compared with the control signal. That comparison can be exact only if the frequency is fixed, but, if the frequency varies, the effects of that variation can be compensated by inserting in the comparator, not the actual value of the control signal, but the product of the latter by the period of the periodic supply voltage.

For that purpose, the invention stipulates that the original value of the integrator defined previously is supplied by a second integrator which receives at the input, the control signal and which is brought back to the value zero at each pass through zero of the said function.

In the case of a switching element controlled on opening, the integral of a function of the supply voltage during the unused portion of a half-period is calculated. For the control to be exact, the integral of that function throughout the entire halfperiod must have a fixed value. If that value varies, a correction may be supplied by adding to the signal a voltage which is representative of the value of that integral throughout the entire halfperiod. This result is obtained by sending on the said second integrator, not only the single control signal, but the sum of the latter and of a voltage which is representative of the said function, this enabling a compensation, simultaneously of the effects of the variations in frequency and the effects of variations in amplitude of the supply voltage, to be obtained automatically.

It has been found, moreover, that, in the particular case where the said function is in a sinusoidal form, it was possible to compensate the effects of the variation in amplitude of the supply voltage alone, which were a hindrance in switching elements controlled on opening, by having the original value of the integrator defined at the outset by a peak detector circuit comprising a capacitor and a resistor, supplied with a voltage which is representative of the said function.

On referring to the accompanying diagrammatic figures, examples of the implementing of the invention, having no limiting character, will be described, taking the case where the average amplitude or the average power of a useful signal emitted by a thyristor or a transistor is controlled linearly. These examples will make it possible to illustrate other characteristics of the invention and, more particularly, arrangements for compensating the variations in amplitude and in frequency of the current supply.

Figure 3:
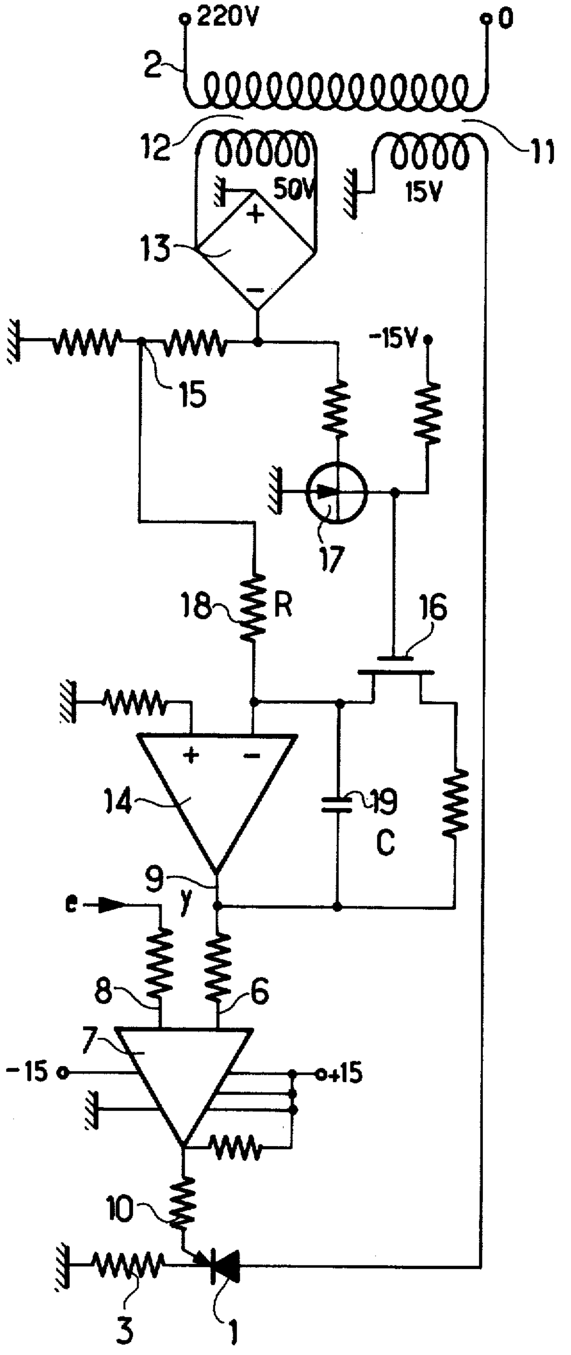
FIG. 3 shows a detailed diagram of the linear control device for the average voltage applied to a charge.
Figure 8:
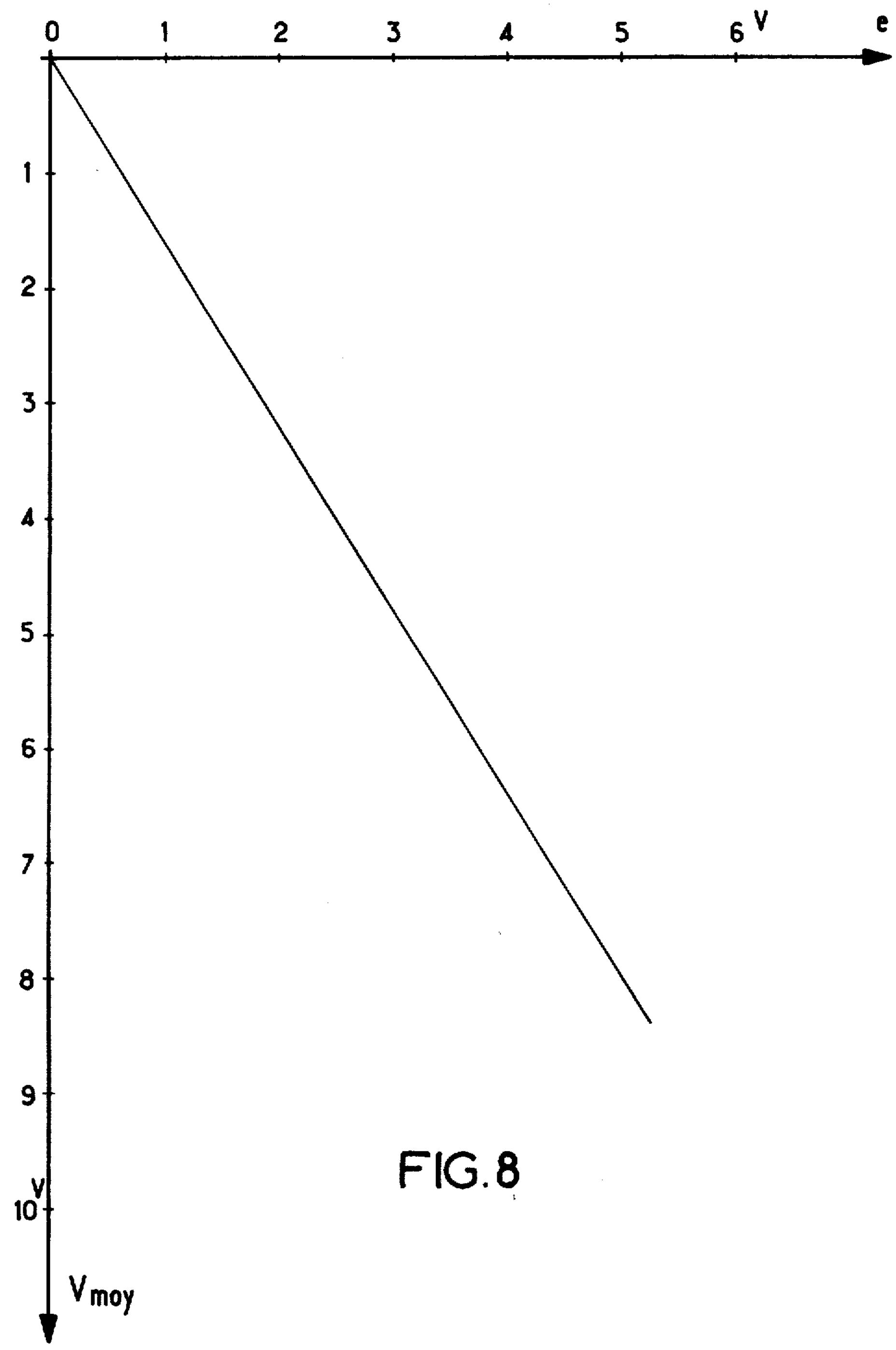
Figure 9:
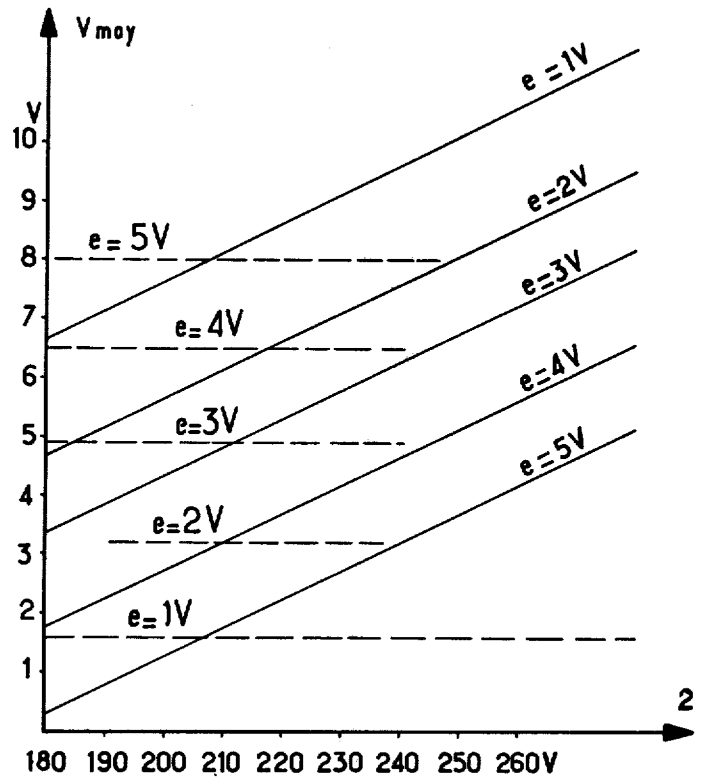
Figure 10:
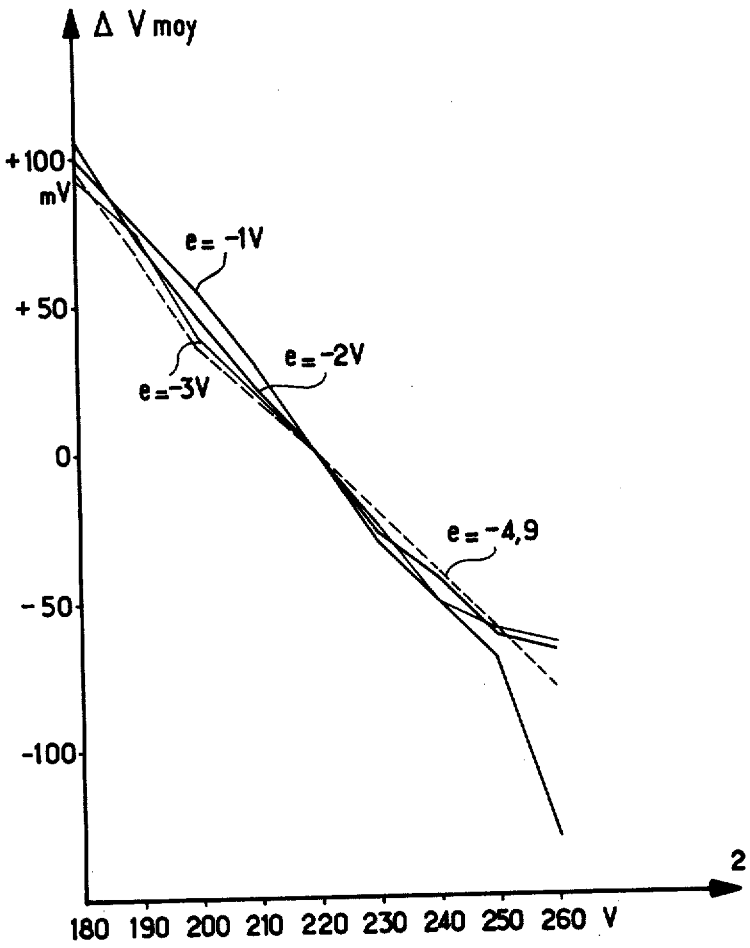
Figure 11:
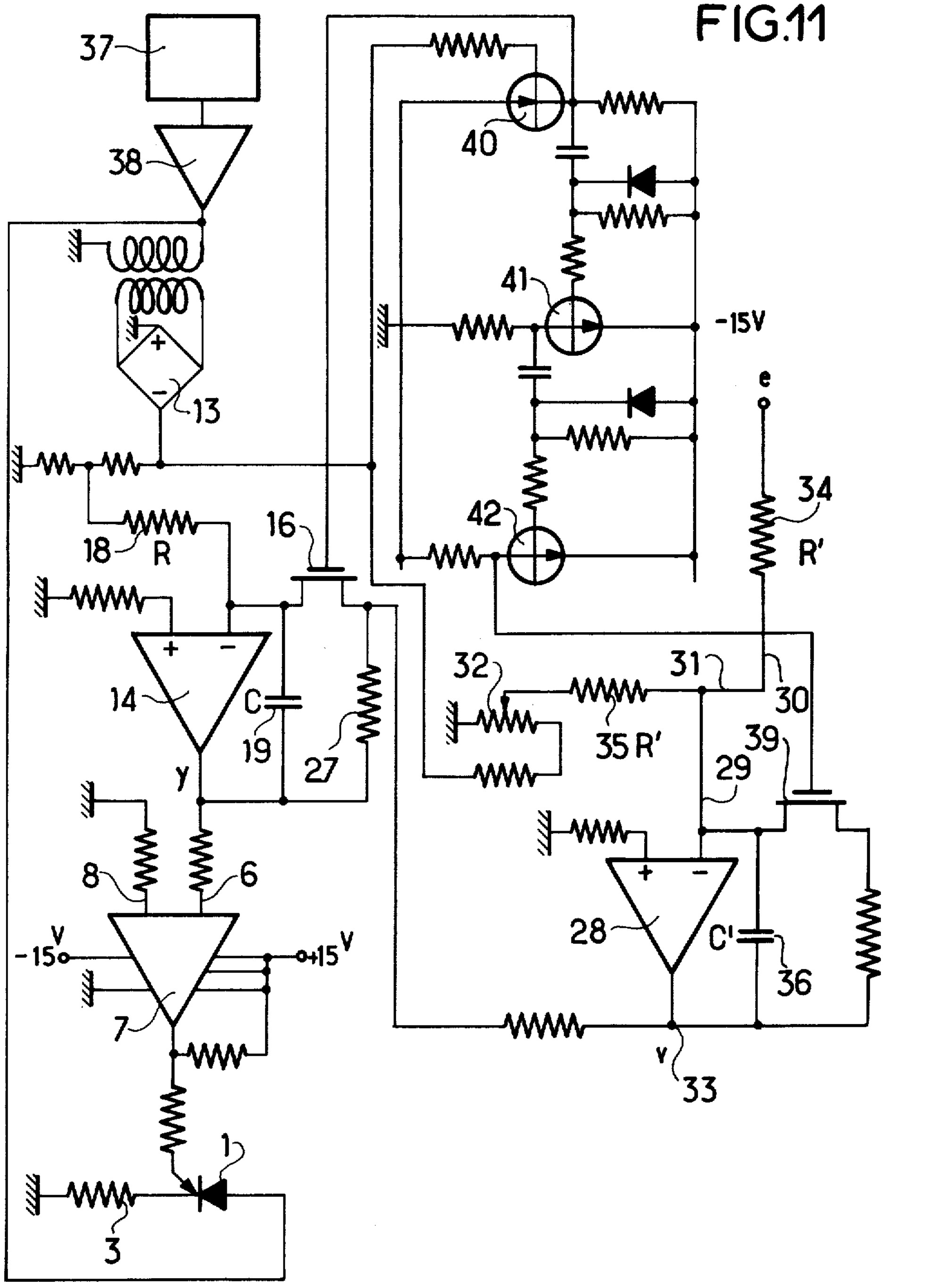
Figure 12:
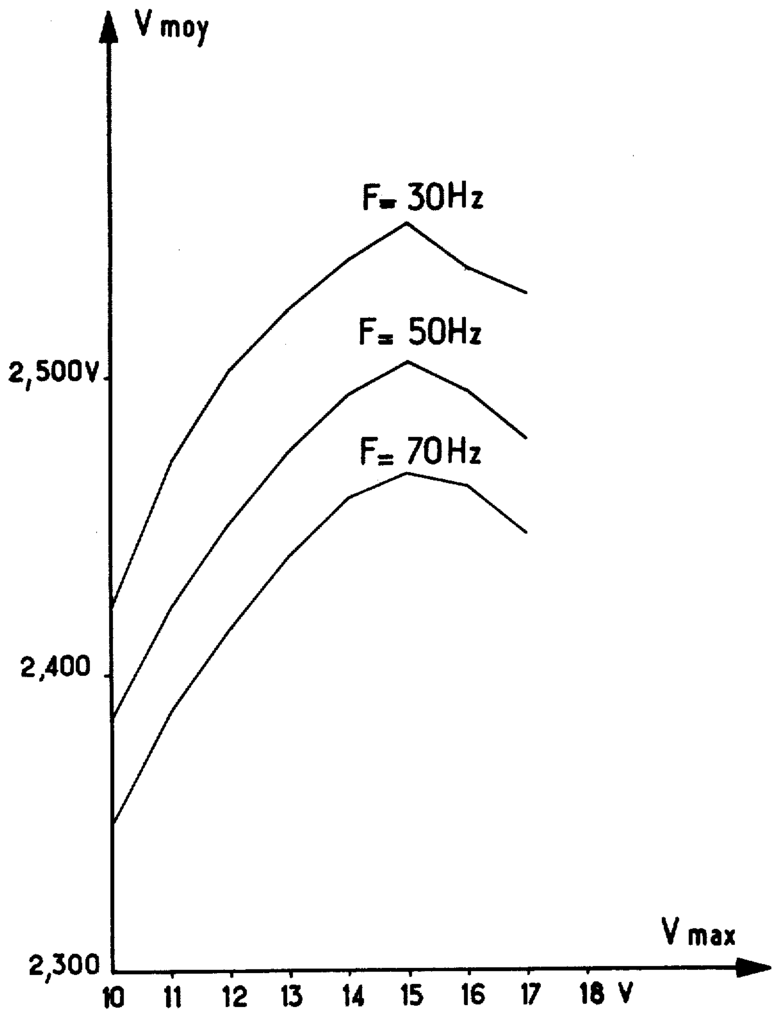
Figure 13:
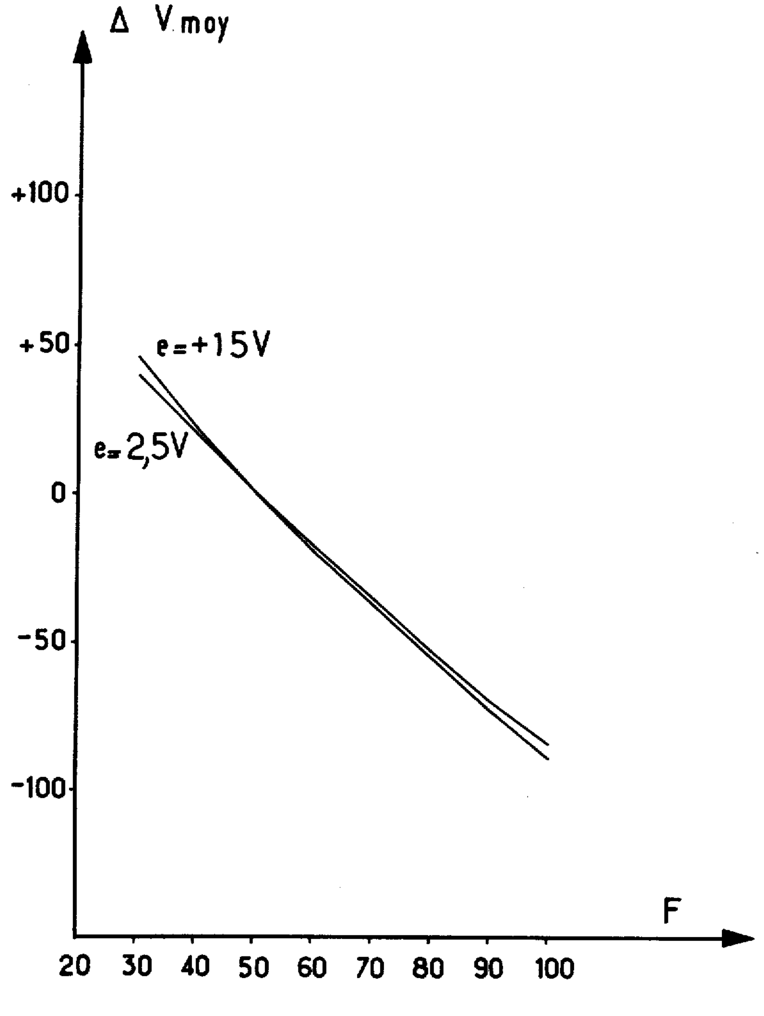
Figure 14:
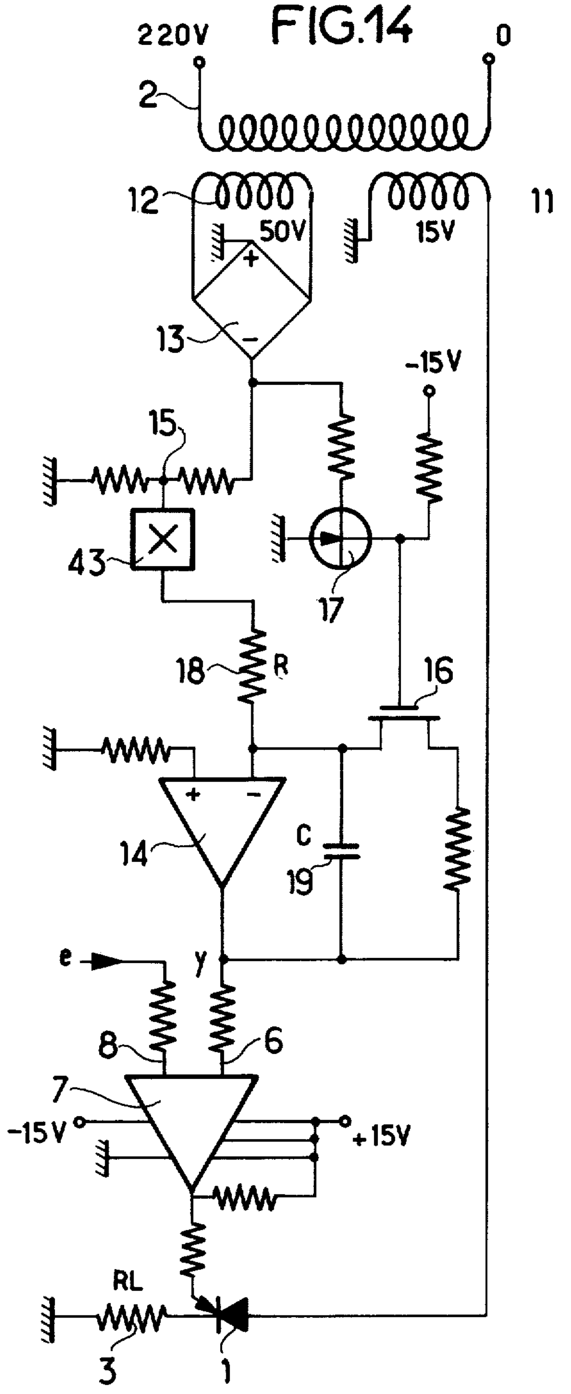
Figure 15:
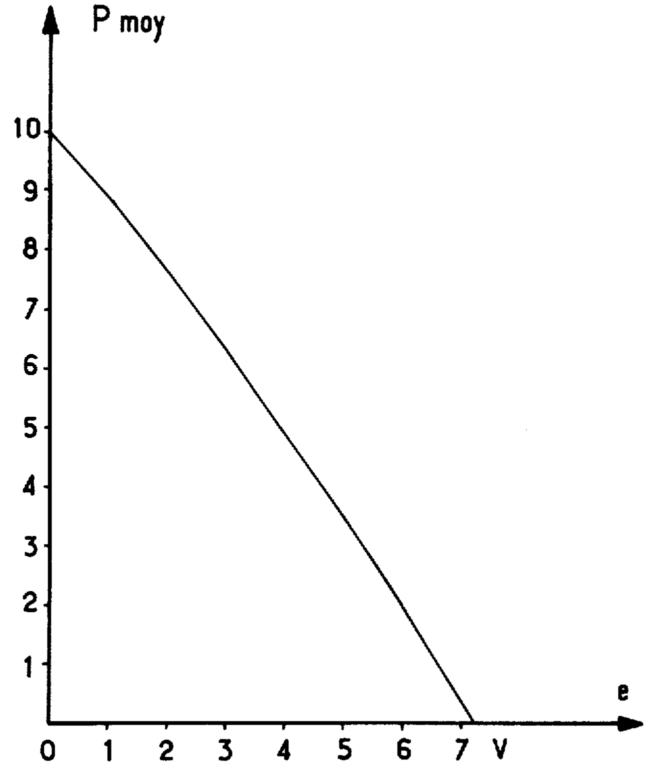
Figure 16:
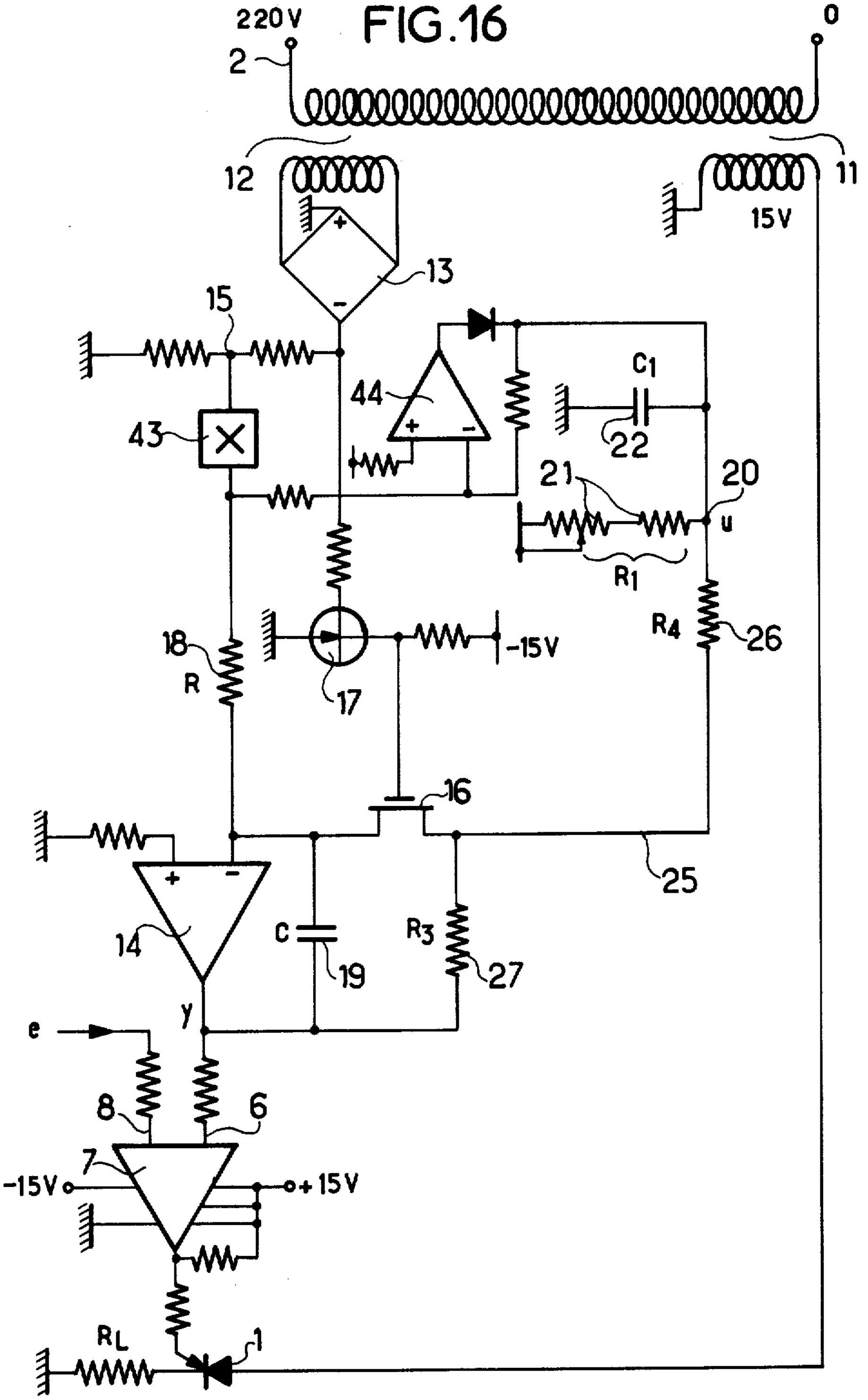
Figure 17:
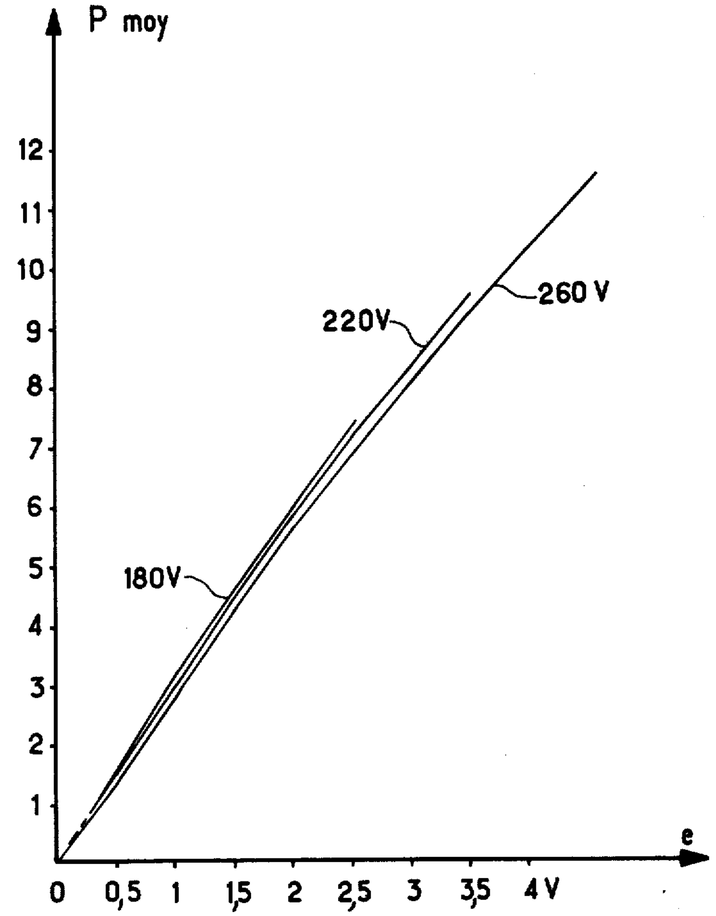
Figure 18:
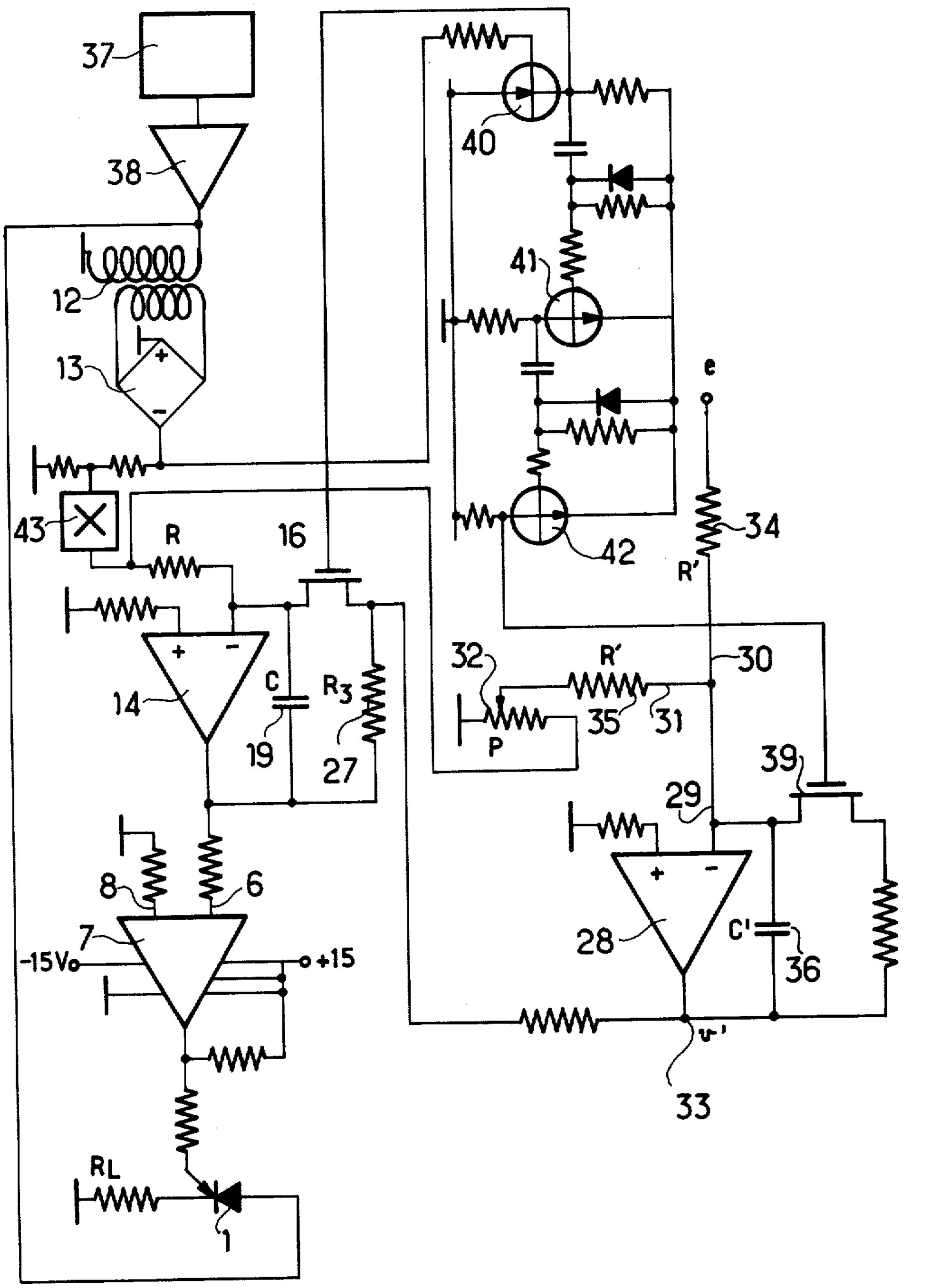
Figure 19:
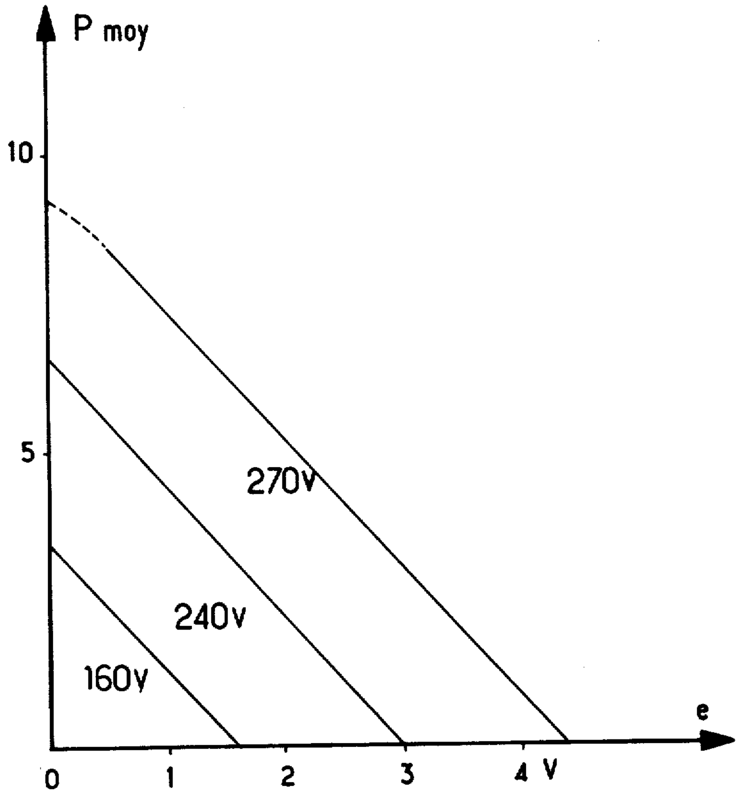
Figure 20:
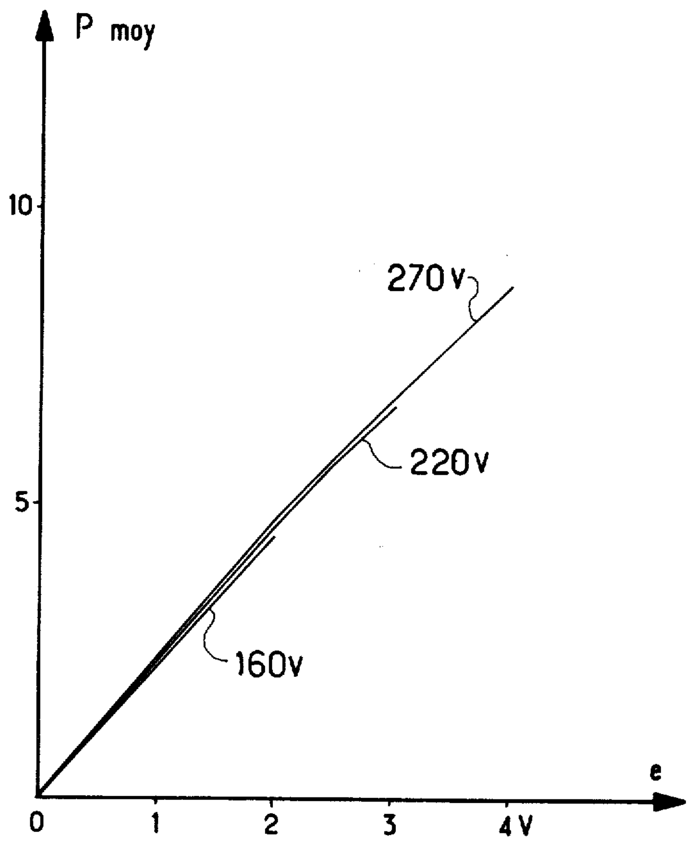

FIGS. 8, 9, and 10 show diagrams thus obtained, respectively, of the average voltage applied to a charge as a function of the control signal, of that average voltage as a function of the amplitude of the supply voltage and of the variation in the average voltage as a function of the amplitude of the supply voltage;

FIG. 11 shows the diagram of a control device such as that in FIG. 3 provided with a device for compensating the effects of the variations in frequency and in amplitude of the supply voltage;

FIGS. 12 and 13 represent diagrams obtained with the device in FIG. 11, respectively, of the average voltage applied to a charge as a function of the amplitude of the current supply and of the variation of that average voltage as a function of the frequency of the current supply;

FIG. 14 shows a diagram of the device for linear control of the average power supplied to a charge;

FIG. 15 shows the diagram of the average power thus obtained, as a function of the control voltage;

FIG. 16 shows the diagram of a control device such as that in FIG. 14, provided with a device for compensating the effects of the variations in amplitude of the supply voltage;

FIG. 17 shows the diagrams thus obtained of the average power as a function of the control signal;

FIG. 18 shows the diagram of FIG. 14 provided with a device for compensating the effects of the variations in frequency and amplitude of the supply voltage; and FIGS. 19 and 20 show diagrams of the average power as a function of the control signal respectively with frequency correction and without amplitude correction, and with both amplitude and frequency correction.

Figure 1:
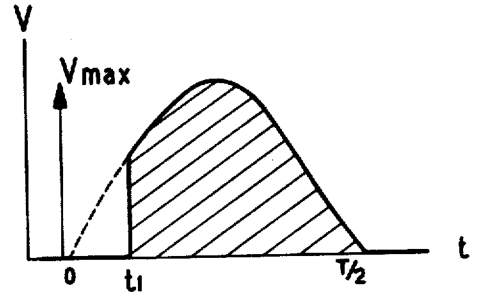
FIG. 1 shows a half-wave of supply voltage and the portion used by a thyristor.

FIG. 1 shows a voltage half-wave of a current supply feeding a resistive charge through a thyristor which is fired at the instant $t_1$.

The average value V moy of the voltage applied to the charge is $$V\text{ moy} = \frac{1}{T}\int_{t_1}^{½}$$

$V$ max sin.$\omega$ $T$ $DT$, $T$ being the period of the supply voltage and $V$ max the maximum value of that voltage.

The average value may again be expressed in the following form:

$$V\text{ moy} = \frac{V\text{ max}}{\pi} \quad \frac{V\text{ max}}{T}\int_0^{t_1} \sin \omega t\, dt \qquad (1)$$

if $V$ max is constant.

For V moy to be proportional to a control voltage e, the following must be so:

$$\frac{V\text{ max}}{\pi} - \frac{V\text{ max}}{T}\int_0^{t_1} \sin \omega t\, dt = ke.$$

In the case of a transistor operating in blocked and saturated conditions, the control is effected on closing, and the average value of the voltage applied to the charge is:

$$V\text{ moy} = \frac{V\text{ max}}{T}\int_0^{t_1} \sin \omega t\, dt \qquad (2)$$

Therefore, for $V$ moy to be proportional to a control voltage $e$, the following must be so:

$$\frac{V\text{ max}}{T}\int_0^{t_1} \sin.\, \omega t = dt = ke.$$

Figure 2:
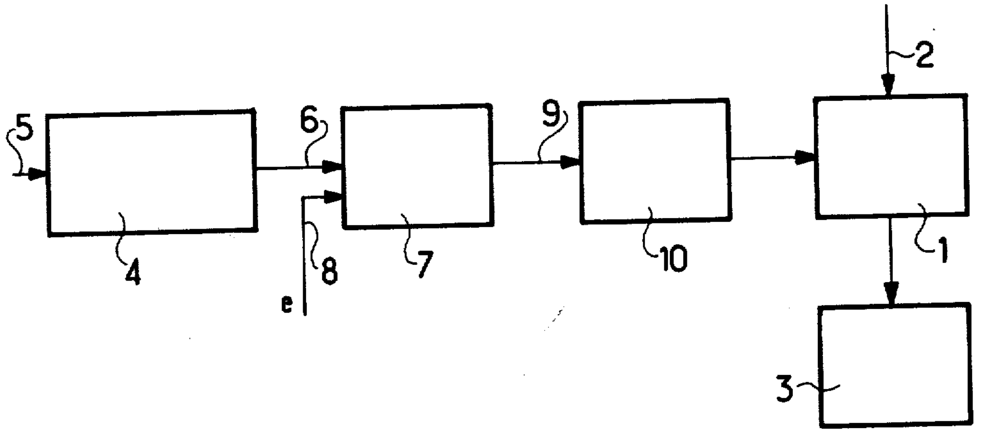
FIG. 2 shows the block diagram of a control device according to the invention.

FIG. 2 shows the block diagram of a control device for a control element 1 such as a thyristor or a transistor placed between a mains supply 2 and a lead 3.

A calculating block 4 receives at 5 the voltage of the mains supply 2 and calculates the integral of a function of that supply voltage. If the amplitude of that voltage is required to be kept proportional to the control voltage e, the instantaneous value of $\int_0^t \sin.\omega\, t\, dt$ is calculated. That value is sent to the input 6 of a comparator 7 whose other input 8 receives the control voltage $e$. At the instant $t_1$ where the result of the comparison is equal to that required, the comparator 7 sends a signal 9 to the control device 10 of the switching element 1.

FIG. 3 shows the detailed diagram of a device for the linear control of the average voltage applied to the road.

The mains supply 2 feeds the load 3 through a transformer 11 and through the switching element 1, which it has been assumed, in the figure, is a thyristor.

That mains supply 2 feeds the control device of the thyristor 1 by means of a transformer 12 and a rectifier bridge 13. An amplifier 14 receives at 15 an instantaneous voltage equal to $\alpha$V max sin. $\omega$x, $\alpha$ being the ratio between the voltage applied to the thyristor 1 and the voltage at 15.

A field effect transistor 16, controlled by a transistor 17, becomes conductive at each pass of the sinusoid of the voltage rectified in the bridge 13 through zero, this starting up the integrator 14 at the value zero.

When the voltage applied to the transistor 16 has reached the blocking voltage of the latter, the amplifier 14 acts as an integrator having a gain of 1/RC, R being the value of the resistor 18 and C that of the capacitor 19. The voltage $y$ at the output of the integrator 14 is:

$$y = \frac{1}{RC}\int_0^{t} \alpha V\text{ max sin. } \omega t\, dt.$$

The voltage $y$ is applied to the comparator 7. At the instant $t_1$ when the voltage $y$ is equal to the control voltage $e$, the comparator 7 changes states and triggers the thyristor 1. The result obtained is then:

$$\frac{1}{RC}\int_0^{t_1} \alpha V\text{ max sin. } \omega t\, dt = e \qquad (3)$$

and, according to equation (1):

$$V\text{ moy} = \frac{V\text{ max}}{\pi} - \frac{RC}{\alpha T}e \qquad (4)$$

Figure 4:
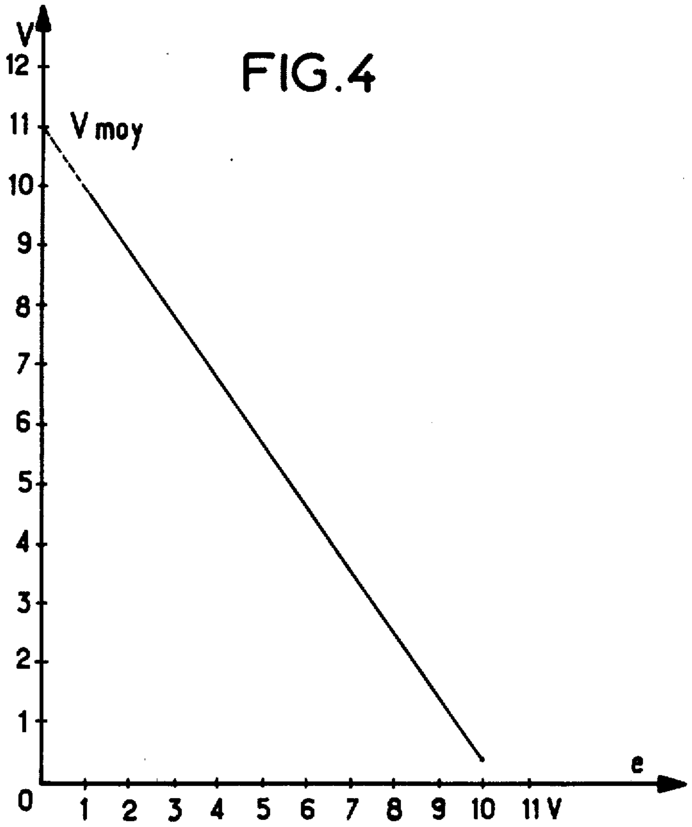
FIG. 4 shows the diagram of the average voltage thus obtained as a function of the control voltage.

The average value of the voltage applied to the load 3 is therefore in actual fact a linear function of the voltage $e$, as shown in FIG. 4, where the voltage $V$ moy read for various values of the control voltage shown in the abscissa has been shown in the ordinate.

If the switching element 1 is a transistor, the change in states of the comparator 7 must have the effect of blocking that transistor. Therefore, according to equations (2) and (3), the result obtained is:

$$V\text{ moy} = \frac{1}{T}\int_0^{t_1} V\text{ max sin. } \omega t\, dt = e.\ \frac{RC}{\alpha T} \qquad (5)$$

The average value of the voltage applied to the charge 3 is therefore truly, in the case of a transistor, a linear function of the voltage $e$.

The formula (4) shows that, in the case of a switching element controlled on opening, the average value of the voltage applied to the load is a linear function of the maximum value V max of the mains voltage, whereas in the case of a switching element controlled on closing, the formula (5) shows that V max does not come into effect. Physically, this is due to the fact that in the first case, the value which is not required is calculated, then the control signal is sent out, after which, the system is no longer controlled and any disturbance modifies the final response, whereas, in the second case, any disturbance occurring during the calculation of the required value is dealt with by the calculating element.

On the contrary, in the two cases, the variations in frequency of the mains disturb the control, since in formulas (4) and (5), the period T comes into effect.

The two previously mentioned compensation devices will be described successively: a device for compensating the variations in amplitude of the current supply which is of interest only in the case of a switching element controlled on opening and of a sinusoidal voltage, and a device for compensating the variations in frequency of the electricity supply, which is of interest in both cases of switching elements, whatever the form of the periodic supply voltage may be, and which has, moreover, the property of enabling also the compensation of the variations in amplitude of the current supply to be ensured.

The compensation of the variations in amplitude alone consists in adding to the control voltage $e$ a voltage A. V max proportional to the maximum value V max, so as to compensate the expression: $V$ max/$\pi$ in formula (4). For that purpose, the following must be so:

$$A \cdot \frac{RC}{\alpha T} = \frac{1}{\pi}.$$

That addition may, more particularly, be effected by starting up the integrator 14.

Figure 5:
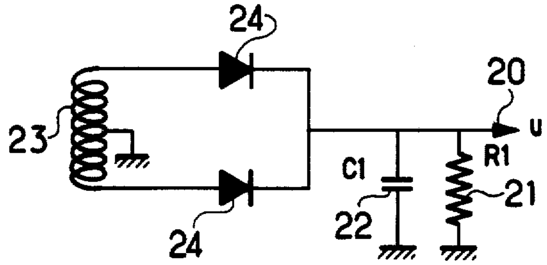
FIG. 5 shows a device used for compensating the effects of variations in amplitude of the supply voltage.

In the case of a sinusoidal supply voltage, the voltage A. V max may be, as shown in FIG. 5, collected at 20 at the output of a peak detector circuit comprising a resistor 21 and a capacitor 22 supplied with a rectified voltage in the two alternances, proportional to that of the electricity supply. That rectified voltage is itself obtained by means of a transformer 23 and diodes 24.

Figure 6:
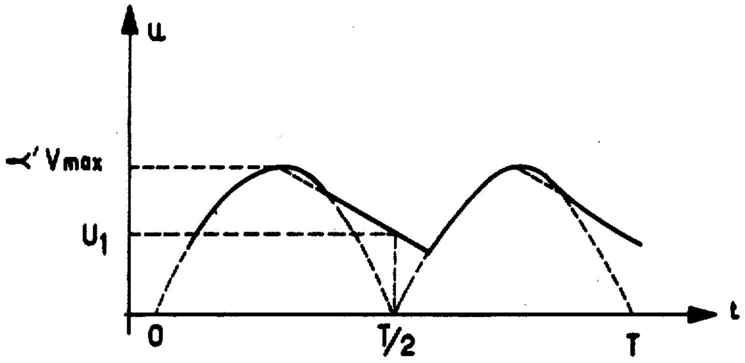
FIG. 6 shows the voltage obtained at the output of that device.

FIG. 6 shows, in continuous lines, the voltage produced by that compensation circuit, and in dotted lines, the rectified voltage waves, the voltage being shown in the ordinate and time in the abscissa.

In the ascending portion of the voltage curve, the latter follows the sinusoid. In the descending portion, it follows the sinusoid whereas the slope of the discharge exponential of the capacitor 22 is greater than that of the sinusoid (diode conductive) and it continues according to a time constant when the slope of the exponential is lower than that of the sinusoid (diode blocked).

At the instant $T/2$, the voltage $u_1$ collected at 20 is:

$$u_1 = \alpha' \max e - \frac{T}{4R_1C_1}$$

Where $\alpha'$. $V$ max is the value of the voltage at the peak of the sinusoid, $R_1$ is the value of the resistor 21 and $C1$ is the value of the capacitor 22.

The slope of the exponential being proportional to V max, $u_1$ is independent from the point of intersection of the sinusoid and of the exponential.

At each alternance, the value $u_1$ must be memorized and added to the control voltage $e$.

Figure 7:
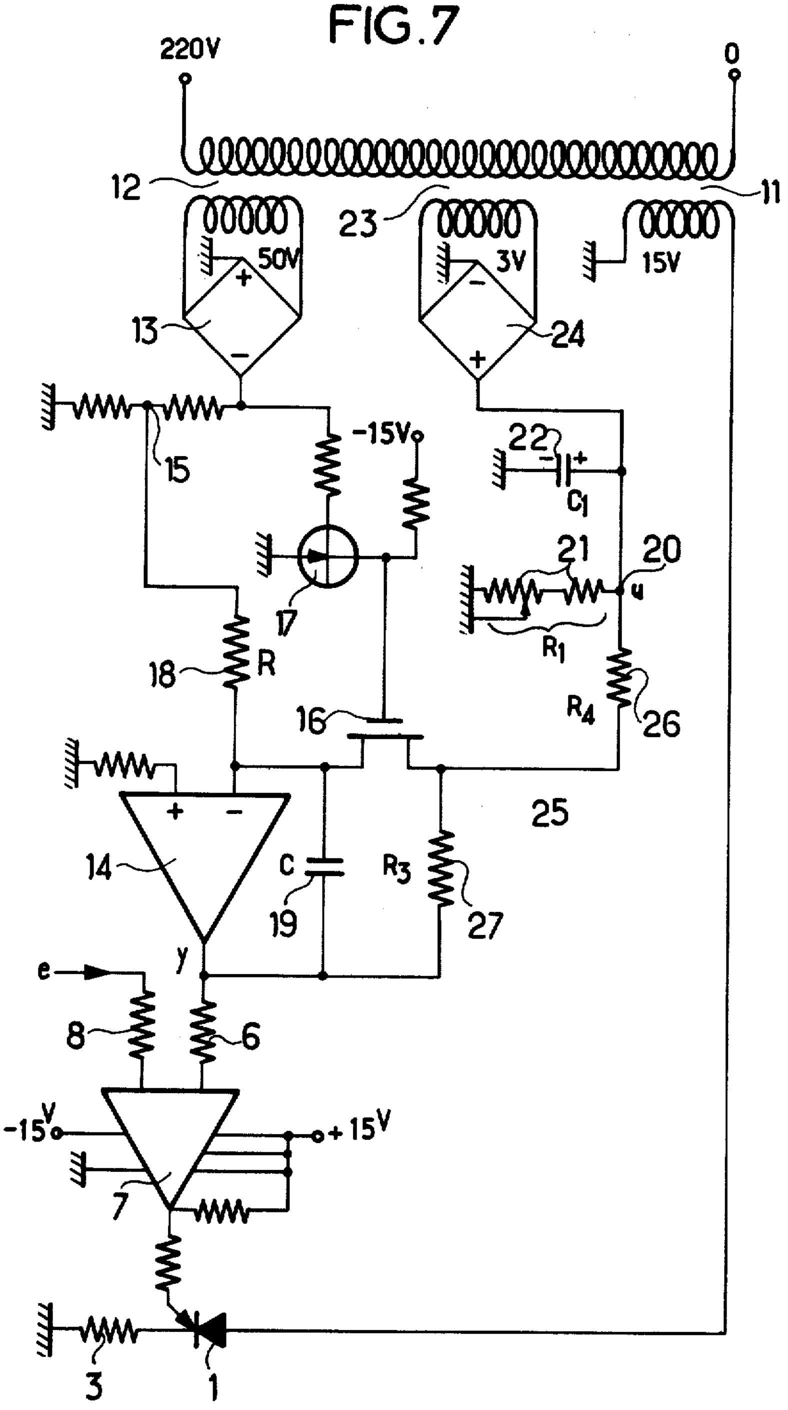
FIG. 7 shows the diagram of a control device such as that in FIG. 3, provided with a compensation device according to FIG. 5.

The invention provides for this to be effected simply by starting up the integrator 14, not, in this case, at zero, but at a value proportional to $u_1$, by means of a circuit such as shown in FIG. 7, which includes the elements in FIGS. 3 and 5 with, moreover, a connection line 25 with a resistor 26, betweem the output 20 and the transistor 16. The resistor 26, having a value of $R_4$, defines, with the resistor 27, having a value of $R_3$, placed at the terminals of the integrator 14, the voltage at which the latter is started up.

The equation (4) then becomes:

$$V \text{ moy} = \frac{V\max}{\pi} - \frac{RC}{\alpha T}e - \frac{RC}{\alpha T}\,'V\max\,\frac{R_3}{R_4}e - \frac{T}{4R_1C_1}$$

Therefore, the following equation must be obtained:

$$\frac{1}{\pi} = \frac{\alpha' RC}{\alpha T} \cdot \frac{R3}{R4}e - \frac{T}{4R_1C_1}$$

To obtain that equation, a potentiometer has been added to the resistor 21.

FIG. 8 shows the average value $V$ moy thus obtained as a function of the control voltage $e$, the voltages being expressed in volts and the voltage of the mains supply being 220 volts.

In FIG. 9, the voltages of the mains supply 2 have been shown in volts on the abscissa and the average value V moy also expressed in volts has been shown on the ordinate, and the variations of V moy as a function of the mains voltage has been shown by a continuous line and a dotted line for various values of the control voltage $e$: 1V, 2V, 3V, 4V, 5V, obtained respectively without the compensation device and with the compensation device.

In FIG. 10, the voltages of the mains supply 2 has been shown in volts on the abscissa, and the variations V moy of the average voltage expressed in millivolts, have been shown in the ordinate, and the curves of variations obtained for several values of the control voltage e have been traced: −1V, −2V, −3V, −4.9V, the adjusting of the compensation having been effected for a mains current of 220 volts.

These tests have shown that this compensation device reduced the effects of the variations in amplitude of the current supply in a ratio of 1 to 17.

If a linear relation between V moy and $e$ is to be obtained whatever the value of T may be, that is, whatever the frequency may be, the product of the control signal e by the period T of the mains voltage is put into effect, and not that control signal $e$, in the direct or indirect action on the comparator 7.

It has been found that it was possible to obtain that result by having the original value of the integrator 14 supplied by another integrator, such as the integrator 28 in FIG. 11, receiving, at its input 29, the control signal $e$ arriving at 30.

That integrator 28 makes it possible to effect also the compensation of the effects of the variation in amplitude of the mains supply if, instead of applying at the input 29 only the voltage $e$, a voltage rectified in the two alternances, proportional to the periodic supply voltage, is added to the latter. That latter voltage is obtained at 31 through a potentiometer 32 by means of the rectifier bridge 13.

The voltage V obtained at the output 33 of the integrator 28 has the form:

$$V = \frac{1}{R'C'} \int_0^{\frac{T}{2}} (a' \, V\max \sin \omega t + e) \, dt = \frac{\alpha'' T}{R'C'} \cdot \frac{V\max}{\pi} + \frac{T.e}{2R'C'}$$

Where $\alpha''$ is a coefficient, R' is the value of the input resistors 34, 35 of the integrator 28 and C' is the value of the capacitor 36 linking the input and the output of that integrator together.

At each half-period, the integrator 14 is started up at that value V. The output $y$ is compared with the ground potential in the comparator 7 and, when, at the instant $t_1$, the latter changes states and controls the priming of the thyristor 1, the result obtained is:

$$\frac{1}{RC} \int_0^{t_1} \alpha . \, V\max \sin \omega t \, dt - V = 0$$

and consequently, according to the equation (1)

$$V\,\text{moy} = \frac{V\max}{\pi} - \frac{RC}{\alpha T} \, V = \frac{V\max}{\pi} - \frac{RC}{2\alpha R'C'} \cdot e - \frac{V\max}{\pi} \cdot \frac{\alpha''}{\alpha} \cdot \frac{RC}{RC}$$

By obtaining, by means of the potentiometer 32, the equation $$\frac{\alpha'' RC}{\alpha R'C'} = 1, \text{ the result obtained in} = V\,\text{moy} = \frac{RC}{2R'C'\alpha} \cdot e.$$

The average value V moy is thus a linear function of the control voltage $e$; it is independent from the amplitude and the frequency of the sinusoid of the supply voltage.

In the example shown, to enable tests to be made with great variations in the supply frequency, the rectifier bridge 13 has been fed, not by the mains, but by a low-frequency generator 37 and a power amplifier 38.

As the integrator 14 has to be started up, by means of the field effect transistor 16, with the voltage collected at 33, before the integrator 28 is started up at zero by a field effect transistor 39, in an arrangement comprising three transistors 40, 41, and 42, a delay in the pulse supplied by the transistor 42 which acts on the field effect transistor 39, is created in relation to the pulse supplied by the transistor 40 which acts on the field effect transistor 16.

FIG. 12 shows, on the ordinate, the value of V moy in volts, and on the abscissa is shown that of V max in volts, and the three curves obtained respectively for supply voltage frequencies of 30 c/s, 50 c/s, and 70 c/s, with a control voltage 3 of 1.5 volts.

In FIG. 13, the deviation of the average voltage V moy has been shown on the ordinate, and the frequency of the current supply has been shown on the abscissa, and the curves obtained respectively for $e = 1.5$ volts and for $e = 2.5$ volts have been traced.

The experimental curves thus obtained show that a reduction in the effects of variations in amplitude and in frequency of the supply voltage are obtained in a ratio of 1 to 50 approximately with the device in FIG. 11.

FIG. 14 shows a diagram of the control device of the switching element 1, establishing a linear relation between the average power supplied to the charge 3 and the control signal $e$. That diagram is, in all points, identical to that in FIG. 3, with only this difference, that it comprises a multiplier 43 which enables the integrator 14 to integrate the square of the voltage applied at 15.

The instantaneous value of the voltage y at the output 19 of the integrator 14 started up at zero at each pass through zero of the rectified two-alternance sinusoid at 13, is:

$$y = \frac{1}{RC} \int_0^{t} \alpha^2 \, V^2\max \sin^2 \omega t \, dt$$

At the instant $t_1$, where the comparator 7 changes stages and acts on the switching element 1, that voltage is equal to $e$. The result is that:

$$\int_0^{t_1} V^2\max \sin^2 \omega t \, dt = e . \frac{RC}{\alpha 2}$$

The average power P moy supplied to the charge P moy $= V^2/RL$ is written, in the case of a thyristor:

$$P\,\text{moy} = \frac{1}{TRL} \int_{t_1}^{T/2} V2\max \sin^2 \omega t \, dt,$$

$RL$ being the resistance of the charge 3, or again:

$$P\,\text{moy} = \frac{V^2\max}{4\,RL} - \frac{1}{TRL} \int_0^{t_1} V^2\max \sin^2 \omega t \, dt,$$

that is:

$$P\,\text{moy} = \frac{V^2\max}{4\,RL} - \frac{RC}{\alpha T} \cdot \frac{1}{RL} \cdot e \qquad (6)$$

In the case of a transistor, the result obtained is:

$$P\,\text{moy} = \frac{1}{TRL} \int_0^{t_1} V^2\max \sin^2 \omega t \, dt$$

that is:

$$P\,\text{moy} = \frac{RC}{\alpha 2_T} \cdot \frac{1}{RL} \cdot e$$

In both cases, there is effectively a linear relation between $P$ moy and $e$.

It will be observed, as previously, that V max does not come into effect in the formula (7) relative to a switching element controlled on closing, but comes into effect in the formula (6) relative to a switching element controlled on opening. In both cases, the frequency of the electricity supply comes into effect.

FIG. 15 shows the experimental reading of the variation in $P$ moy as a function of the control signal $e$, in a device such as that in FIG. 14, not comprising any compensation system.

FIG. 16 shows the device in FIG. 14, provided with a compensation of the variations in amplitude of the supply voltage. The circuit in that figure is analogous to that in FIG. 7, except for the adding of the multiplier 43 already effected in FIG. 14, and except for a modification in the supply means of the detector circuit comprising a resistor 21 and a capacitor 22. That detector circuit is here fed by means of an amplifier 44 by the voltage at 15 raised to the square at 43.

The integrator 14 is thus started up, at each pass through zero of the sinusoid of the supply voltage, at a voltage $u'1$ having the form:

$$u'_1 = \beta^2 V^2 \max e - \frac{T}{4R_1 C_1}$$

The equation (6) is then written:

$$P \text{ moy} = \frac{V^2\max}{4\ RL} - \frac{RC}{2_T} - \frac{e}{RL} - \frac{RC}{\alpha 2_T} \cdot \frac{1}{RL} T \cdot \beta^2 V^2 \max \cdot \frac{R3}{R4} \cdot e - \frac{T}{4R_1C_1}$$

Therefore, it is necessary to obtain the equation:

$$\frac{V^2\max}{4\ RL} = \frac{RC}{\alpha 2_T} \cdot \frac{1}{RL} \beta^2 V^2\max \cdot \frac{R_3}{R_4} - \frac{T}{4R_1C_1}$$

or $$\frac{4RC}{\alpha 2_T} \beta^2 \frac{R_3}{R_4} \cdot e - \frac{T}{4R_1C_1} = 1$$

That equation is obtained by means of the potentiometer added to the resistor 21.

FIG. 17 shows the average power thus obtained as a function of the control voltage $e$, for supply voltages of 180V, 220V, and 260V, respectively.

To obtain a compensation of the effects of the variations in the supply frequency, it is possible, as previously, to have the original value of the integrator 14 supplied by another integrator 28, receiving, at the input 29, the control signal e.

It is also possible to combine that compensation with a compensation of the effects of the variations in amplitude of the current supply, by applying to the integrator 28 the sum of the voltage e and of a voltage originally proportional to the supply voltage, rectified in the two alternances and raised to the square, that latter voltage possibly being tapped simply at the output of the multiplier 43. Thus, a circuit according to formula 18, analogous to that in FIG. 11, is obtained, the only difference arising from the adding of the multiplier 43.

The voltage $V'$ obtained at 33 has the form:

$$V' = \frac{1}{R'C''} \int_0^{\frac{T}{2}} (\beta'^2 V^2 \max \sin^2 \omega t + e)\, dt$$

$$\frac{\beta'^2 V^2\max}{4} \; \frac{T}{R'C''} + \frac{e\,T}{2R'C''}$$

$V'$ is used for starting up the integrator 14. At the instant $t_1$, the following equation is obtained:

$$\frac{1}{RC} \int_0^{T_1} \alpha^2 V^2 \max \sin^2 \omega t\, dt = V'$$

The following is derived therefrom in the case of a thyristor:

$$P \text{ moy} = \frac{V^2\max}{4\ RL} - \frac{RC}{R'C'} \times \frac{1}{2\ RL} \times \frac{e}{\alpha 2} \; \frac{\beta' 2}{\alpha 2} \; \frac{RC}{R'C'} \times \frac{1}{4RL} V^2\ ax:$$

By obtaining, by means of the potentiometer 32, the equation:

$$\frac{(\beta')}{\alpha} \; \frac{2\ RC}{R'C''} = 1$$

The following result is obtained:

$$P \text{ moy} = \frac{RC}{R'C''} \times \frac{1}{RL} \times \frac{e}{\alpha 2}$$

$P$ moy is thus independent from the amplitude and from the frequency of the sinusoid of the supply voltage.

FIGS. 19 and 20 show $P$ moy as a function of $e$ for voltages of 160V, 220V, and 270V, respectively with a correction of the frequency alone, and with a correction of the frequency and of the amplitude of the current supply. The experimental results thus obtained have shown that it was possible, with the compensation device in FIG. 18, to reduce the effects of the variations in the current supply in a ratio of 1 to 60 approximately.

What is claimed is:

1. Device for controlling by impulses, responsive to a control signal, a switching element operating by an on-off process and connected to a current supply having a periodic voltage, comprising rectifier means for rectifying said supply voltage, an integrator connected to receive said rectified supply voltage for providing the instantaneous value of the integral of a function of that supply voltage, a comparator connected to receive at one input said instantaneous value from the output of said integrator and at the other input said control signal, and applies to said switching element, according to the comparison of those two magnitudes, a switching order for opening or closing the switching element, and means for resetting said integrator, at each pass through zero of the periodic supply voltage, to an original value, other than zero, provided for compensating variations in the periodic voltage supply, the original value of said integrator being supplied by a second integrator which receives, at its input, said control signal, and further means for resetting said second integrator to zero at each pass through zero of the said function.

2. Control device according to claim 1, characterized in that the input of said second integrator is the sum of the control signal and the output of said rectifier means.

3. Device for controlling by impulses, responsive to a control signal, a switching element operating by an on-off process and connected to a current supply having a periodic voltage, comprising rectifier means for rectifying said supply voltage, an integrator connected to receive said rectified supply voltage for providing the instantaneous value of the integral of a function of that supply voltage, a comparator connected to receive at one input said instantaneous value from the output of said integrator and at the other input said control signal, and applies to said switching element, according to the comparison of those two magnitudes, a switching order for opening or closing the switching element, and means for resetting said integrator, at each pass through zero of the periodic supply voltage, to an original value, other than zero, provided for compensating variations in the periodic voltage supply, the original value of the said integrator being supplied by a second integrator which receives, at its input, the sum of the control signal and a voltage which is representative of the said function and further means for resetting said second integrator to zero at each pass through zero of the said function.

4. Device for controlling by impulses, responsive to a control signal, a switching element operating by an on-off process and connected to a current supply having a periodic voltage, comprising rectifier means for rectifying said supply voltage, an integrator connected to receive said rectified supply voltage for providing the instantaneous value of the integral of a function of that supply voltage, a comparator connected to receive at one input said instantaneous value from the output of said integrator and at the other input said control signal, and applies to said switching element, according to the comparison of those two magnitudes, a switching order for opening or closing the switching element, and means for resetting said integrator, at each pass through zero of the periodic supply voltage, to an original value, other than zero, provided for compensating variations in the periodic voltage supply, said function of the supply voltage being in a sinusoidal form, characterized in that the input of said integrator is supplied by a peak detector comprising a resistor and a capacitor fed by a voltage which is representative of the said function.

5. Device for controlling by impulses, responsive to a control signal, a switching element operating by an on-off process and connected to a current supply having a periodic voltage, comprising rectifier means for rectifying said supply voltage, an integrator connected to receive said rectified supply voltage for providing the instantaneous value of the integral of a function of that supply voltage, a comparator connected to receive at one input said instantaneous value from the output of said integrator and at the other input said control signal, and applies to said switching element, according to the comparison of those two magnitudes, a switching order for opening or closing the switching element, and means for resetting said integrator, at each pass through zero of the periodic supply voltage, to an original value, other than zero, provided for compensating variations in the periodic voltage supply, the input of said integrator being supplied by a peak detector comprising a resistor and a capacitor fed by the output of said rectifier means.

6. Device for controlling by impulses, responsive to a control signal, a switching element operating by an on-off process and connected to a current supply having a periodic voltage, comprising rectifier means for rectifying said supply voltage, an integrator connected to receive said rectified supply voltage for providing the instantaneous value of the integral of a function of that supply voltage, a comparator connected to receive at one input said instantaneous value from the output of said integrator and at the other input said control signal, and applies to said switching element, according to the comparison of those two magnitudes, a switching order for opening or closing the switching element, and means for resetting said integrator, at each pass through zero of the periodic supply voltage, to an original value, other than zero, provided for compensating variations in the periodic voltage supply, the input of said integrator being supplied by a peak detector circuit comprising a resistor and a capacitor connected to the output of said rectifier means and raised to the square of squaring means.

7. Device for controlling by impulses, responsive to a control signal, a switching element operating by an on-off process and connected to a current supply having a periodic voltage, comprising rectifier means for rectifying said supply voltage, an integrator connected to receive said rectified supply voltage for providing the instantaneous value of the integral of a function of that supply voltage, a comparator connected to receive at one input said instantaneous value from the output of said integrator and at the other input said control signal, and applies to said switching element, according to the comparison of those two magnitudes, a switching order for opening or closing the switching element, and means for resetting said integrator, at each pass through zero of the periodic supply voltage, to an original value, other than zero, provided for compensating variations in the periodic voltage supply, the input of said integrator being supplied by a second integrator which receives, at its input the sum of the control signal and of a voltage at the output of said rectifier means and raised to the square by squaring means and further means for resetting said second integrator to zero at each pass through zero of the said periodic supply voltage.

* * * * *